United States Patent Office

2,902,501
Patented Sept. 1, 1959

---

2,902,501

UPGRADING OF SODA ASH SOAPSTOCK

Benjamin Clayton, Pasadena, Calif.

No Drawing. Application August 19, 1954
Serial No. 451,055

16 Claims. (Cl. 260—412.5)

This invention relates to the upgrading of soda ash soapstocks obtained in the refining of crude glyceride oils, typically vetetable oils containing phosphatidic materials and fatty acids.

One widely practiced process is to mix with such a glyceride oil an amount of soda ash in excess of that chemically equivalent to the fatty acids present. In one practice, the mixture is dehydrated and rehydrated with soda ash solution before separating the resulting soapstocks from the now substantially neutral oil, this practice requiring excesses of the soda ash. In other practices the dehydration and rehydration steps are omitted and larger excesses of soda ash are required. The present invention is very valuable in treating the soapstocks resulting from the latter processes, although it is useful in upgrading any soda ash soapstock produced by any of the practices mentioned and containing excess soda ash.

Such soda ash soapstocks contain valuable products if they can be put in marketable form. The gums or phosphatidic materials in the crude oil contribute phosphatidic materials to the soapstock but are difficult to recover or process because, among other things, of the sodium soaps and excess soda ash present. The gums in these soapstocks are valuable as animal feed but, usually, cannot be fed directly because of the undesirably high excess of soda ash. To acidulate such soapstocks to recover fatty acids requires large amounts of sulfuric acid, i.e., enough not only to neutralize the excess alkali but also to react with the soaps.

It has been proposed to boil these soapstocks with sufficient sodium hydroxide to decompose the gums and saponify the neutral oil present and then add salt or concentrated alkali to salt out the soaps. The gum decomposition products are washed out and discarded and the soaps that are produced are of low grade and are not well suited to use as animal feed. While the resulting soaps can be acidulated to recover fatty acids, the entire process is expensive and requires costly equipment.

Soda ash soapstocks often contain less than 25% T.F.A. (total fatty acids, available for release from the soaps or phosphatidic materials present) and often contain large amounts of water. Such soapstocks are not currently marketable unless they contain at least 35% T.F.A. There is a need for a simple process of upgrading such soapstocks. It is an object of the present invention to provide such a process.

A further object is to provide a process for decreasing the moisture and the excess soda ash of such soapstocks without the addition of salts and/or acids.

Soda ash soapstocks from cottonseed oil often contain material amounts of gossypol. Unless this gossypol is removed or modified, it may be toxic if fed to certain animals. It has been found that the process of the present invention removes a significant amount of impurities, including such toxic gossypol, it being an object of the invention to provide a process for producing products from a low grade soapstock which are useful, among other things, in animal feeding.

Further objects and advantages of the invention will be evident to those skilled in the art from the following description of an exemplary process operating in accordance with the invention.

The soapstock as separated from the oil in the soda ash refining process contains substantial amounts of excess soda ash. It also contains a substantial amount of water as a result of the refining operation or sometimes as a result of adding water to the soapstock to facilitate its separation from the oil, e.g., to the soapstock pan of a centrifuge used to separate the soda ash soapstock from the refined oil. It is sometimes desirable to add additional water to such soapstock in the present process. The soapstock produced from a soda ash refining operation can be diluted with water up to the weight of the soapstock, as a part of the present process.

According to the present invention, the soapstock is heated and maintained at an elevated temperature under agitation or under turbulent conditions for a period of time sufficient to produce a salting out or graining out action, the temperature and pressure being suitable to the production of a mixture which can be gravitationally or centrifugally separated into a concentrated soap solution and a heavier dark aqueous liquor. The soapstock can be heated and maintained at such elevated temperature in one or more coils or in an autoclave equipped with an agitator. In either instance, the flow can be continuous or the autoclave can be used for batch treatment preparatory to batch or continuous separation.

The soapstock should be maintained at a temperature in excess of 150° C., e.g., a temperature of about 160–220° C. or higher for a period ranging from about 90 minutes at the lower end of such temperature range to about 30–60 minutes at the upper end of such range. The pressure should be such as to prevent boiling of water at the temperature used. Temperatures of about 180–190° C. and pressures of about 180–190 p.s.i., maintained for about one hour will usually be found to be entirely satisfactory, but higher temperatures and correspondingly higher pressures will often give sharper and quicker "break-out" of a soap layer.

The soapstock is often quite difficult to heat thoroughly and it is usually preferable to heat same in stream flow, as by pumping same through a pipe coil surrounded by a heating medium. The soapstock can be maintained at the desired temperature by flowing same through further such pipe coils, wherein there is sufficient turbulence induced by flow to prevent local overheating, or by delivering the heated soapstock to an autoclave or alternately to two autoclaves. Therein the hot soapstock may be kept hot for the desired length of time or further heated by jacketing the vessel and flowing a hot medium through the jacket or by introducing steam into the hot mass. In any autoclave, it is desirable to maintain some degree of turbulence in the mass, as by rotating a stirrer therein to sweep the paddles thereof through the mass.

Separation into the two layers can be effected at relatively high temperatures in the autoclave, if used, or the mass can be discharged into cooled or uncooled vessels wherein the separation will take place. In some practices of the process in this manner, a foamy mass may discharge from the autoclave but the foam will quickly break and the mixture separate into the desired products.

If the resulting product is to be continuously centrifugally separated after discharge from a coil or an autoclave, it can be separated at relatively high temperature so long as the temperature is below the boiling point of water at the pressure at which separation takes place.

In a rapid process, the product is cooled during flow through a coil to a temperature well suited to the centrifugal separation, e.g., to a temperature of about 150–210° F. At such or higher temperatures, the product centrifugally separates cleanly into a lighter concentrated solution and a heavier aqueous liquor.

Regardless of the separating steps used, the process produces a concentrated soap-gum solution which contains substantially less water than the soapstock to be treated and contains a correspondingly higher percentage of T.F.A. The separated soap-gum solution contains a purer soap and less neutral oil than the original soapstock as the oil thereof has been substantially all saponified in the alkaline environment at the high temperatures employed. The separated product is very low in excess soda ash and can be acidulated by use of much smaller quantities of sulfuric acid than would be required to acidulate the original soapstock, producing purer fatty acids containing less oxy-acids. The soap-splitting acid can be mixed with the concentrated soap-gum solution batchwise or continuously, the resulting mixture being separated by batch or continuous methods to produce an acid oil and an aqueous material. The former contains the readily salable fatty acids of the soapstock. In other instances, the concentrated soap-gum solution may be used directly, or after drying, as an animal feed. If it is desired that the feed be slightly acidic, any suitable acid can be added to the concentrated soap-gum solution to bring the pH thereof closer to 7, e.g., to adjust the pH to about pH 6–8.

The process produces a dark aqueous liquor which has a soap or T.F.A. content which is negligibly low. It contains in solution substantially all of the excess soda ash and various other sodium salts including sodium phosphates. By mixing the aqueous liquor with calcium chloride it is possible to separate a mixture of calcium carbonate and calcium phosphates, which can be used as a mineral concentrate for animal feed. The dark aqueous liquor also contains much of the color bodies of the soapstock; also the water soluble products from the decomposition of the phosphatides or gums which takes place. In the processing of cottonseed soapstocks, most of the gossypol will be deactivated and the sodium salt thereof will appear as a part of the aqueous liquor.

Essentially, the process of the present invention involves a graining out or a salting out of the soap and the consequent formation of an aqueous layer. While sodium hydroxide, sodium chloride and sodium sulfate, in concentrated solution, are known to be salting-out agents for soap, soda ash has very little or no salting out properties under ordinary soap boiling conditions.

The mechanism by which the soda ash soapstocks are upgraded by the process of the present invention is not completely understood. It is quite clear, however, that the excess soda ash acts on the phosphatides or gums at the elevated temperature and pressure and in the presence of water to produce water soluble salts which help or make possible the salting out process. The gums or phosphatidic materials are at least partially decomposed at the elevated temperature and in the alkaline environment present. Regardless of the specific actions involved, the process contemplates heating of the excess soda ash soapstock under pressure for a period of time sufficient to cause alteration of the gums or phosphatidic components and to cause eventual graining out or salting out of the soaps.

As one example of the invention, a crude undegummed soya oil having 0.5% free fatty acids was refined with 6% of 26° Bé. soda ash solution. The separated soapstock was a viscous mass containing 51.2% water and 21.6% T.F.A. and containing a substantial amount of excess soda ash. To acidulate such a soapstock would have required 11.8 lbs. of sulfuric acid per 100 pounds of soapstock, to neutralize the excess soda ash, and about 14.2 lbs. of the acid per 100 pounds of soapstock to decompose the soaps, giving a total of about 26 pounds of sulfuric acid required to produce 23.0 pounds of acid oil or 21.2 pounds of T.F.A. from 100 pounds of the soapstock. In accordance with the present invention, this soapstock was heated in an autoclave to a temperature of about 180–190° C., being held within such temperature range under a pressure of about 180–190 p.s.i. for about one hour. The mixture was then cooled to about 70° C. and centrifuged. The resulting concentrated soap solution contained 29.5% water and 54.8% T.F.A. with substantially no excess soda ash. The upgraded product could be converted into acid oil with but 5 pounds of sulfuric acid. The separated aqueous liquor contained 28.0% dissolved solids and a negligible quantity of soap.

As another example of the process, a high excess soda ash soya soapstock was thinned with about 10% by weight of water and preheated in a pipe to about 100–120° C. before delivery to a coil-type heater which raised the temperature to about 200° C. before flow to the first of two serially connected towers or autoclaves in which the soapstock remained for approximately one hour at an average temperature of about 188° C. The effluent material could be centrifugally separated or could be cooled and discharged into one or more settling vessels. In this instance, the cooled material at a temperature of about 135° C. discharged as a foam which broke almost instantly and separated into two distinct layers, the upper a viscous soap layer and the lower a dark-colored aqueous solution. The water content of the soapstock was reduced from 53.8% to 34.8% and the T.F.A. content increased from 19.2% to 44.2%. When the mixture was centrifuged at 70° C., the water content of the soapstock was reduced to 28.7% and the T.F.A. increased in proportion.

In another example, diluting cottonseed soda ash soapstock in the ratio of 1 part soapstock to ½ to 1 part water lowered the temperature at which the "break-out" occurred and reduced the time required, the results being as good at 200° C. with 50% added water as at 220° C. without water, when the temperature was applied for 1 hour. Typical results on soapstock containing 52.6% water and 19.8% T.F.A. showed upgrading to 36.4% water and 42.4% T.F.A. when adding 50% by weight of water and heating 1 hour at 200° C. under 250–275 p.s.i., as compared with 37.8% water and 40.4% T.F.A. when treated at 220° C. with no water added and 46.7% water and 30.6% T.F.A. when heated for 1 hour at 200° C.

Various different apparatus can be employed in the practice of the present process, as outlined above, and as will be apparent to those skilled in the art. Exemplary apparatus useful in the present process are further illustrated in my co-pending application Serial No. 271,365, now Patent No. 2,758,122. Soapstocks from the refining of crude vegetable oils with caustic soda may also be upgraded by the method of the present invention. In addition, it will be apparent to those skilled in the art that various changes can be made in the exemplified process steps without departing from the spirit of the invention.

I claim as my invention:

1. A process of upgrading alkali soapstock separated in the process of refining glyceride oils by mixing an alkali therewith, said separated soapstocks containing free alkali, which upgrading process includes the steps of: heating the separated alkali soapstock to a temperature of about 150–220° C. under sufficient pressure to prevent vaporization of water for a time sufficient to produce a graining out effect, said time varying from about 90 minutes at the lower end of said temperature range to 30–60 minutes at the upper end of such temperature range; and separating the resulting product into an aqueous material containing water-soluble phosphatidic products and into a less dense upgraded liquid material lower in alkali and water than said separated soapstock.

2. A process for upgrading soda ash soapstocks separated in the process of refining glyceride oils by mixing soda ash therewith, said separated soapstocks containing excess soda ash when thus separated, which upgrading process includes the steps of: maintaining such separated soda ash soapstock containing excess soda ash at a high temperature of about 150° C. up to about 220° C. for a prolonged period of time while containing water and while under pressure sufficient to prevent vaporization of such water, said temperature and time being sufficient to produce a mixture separable into two phases; and separating such a mixture into an aqueous material containing water-soluble phosphatidic products and soda ash and into a less dense upgraded material lower in soda ash and water than said separated soapstock.

3. A process as defined in claim 2 in which said soda ash soapstock is maintained at said temperature of about 150° C. up to about 220° C. for a period of time ranging from at least about 90 minutes near the lower end of such range to at least about 30 minutes near the upper end of such range.

4. A process as defined in claim 2 including the step of adding to the soapstock before such period of time an amount of water up to about the weight of the soapstock.

5. A process for upgrading soda ash soapstocks separated in the process of refining glyceride oils by mixing soda ash therewith, said separated soapstocks containing excess soda ash and containing phosphatides from said glyceride oil, said upgrading process including the steps of: heating the soapstock and maintaining same at an elevated temperature of at least about 160° C. under pressure sufficient to prevent vaporization of water for a time sufficient for the excess soda ash to act on the phosphatides of the soapstock to produce a mixture separable into an aqueous material containing decomposed phosphatides and soda ash and into a less dense upgraded soap-gum solution lower in soda ash and water than said separated soapstock; separating said mixture into said aqueous material and said upgraded soap-gum solution; and acidulating said soap-gum solution to liberate fatty acids therefrom.

6. A salting-out process for upgrading soda ash soapstocks that are strongly alkaline as a result of containing excess soda ash, said soapstocks resulting from the soda ash refining of glyceride oils and containing gums from such oils, said process including the steps of: salting out a soap-gum material by heating said soapstock to and maintaining same at a temperature sufficient for the excess soda ash to decompose said gums, said temperature being no more than about 220° C., said soapstock being heated and maintained hot while at a superatmospheric pressure sufficient to prevent vaporizing of water; and separating the resulting product by difference in specific gravity into the salted-out soap-gum material and an aqueous material.

7. A process as defined in claim 6 in which water is mixed with said soapstock up to the weight thereof before heating same, and in which centrifugal force is utilized to separate said resulting product into said salted-out material and said aqueous material.

8. A process as defined in claim 6 in which said resulting product is separated into an aqueous liquor and an upgraded soap-gum solution of reduced soda ash content, and including the step of drying the upgraded soap-gum solution to produce an animal feed.

9. A process for upgrading alkali soapstocks separated in the process of alkali refining crude glyceride oils, said soapstocks containing free alkali, which process includes the steps of: heating said separated soapstock while containing said free alkali to a temperature of about 150° C. up to about 220° C. for a period of time ranging from at least about 90 minutes near the lower end of such range to at least about 30 minutes near the upper end of such range; cooling a stream of said soapstock; and continuously centrifugally separating the cooled stream while at a temperature below the boiling point of water at the pressure at which the centrifugal separation takes place, said separation producing a lighter concentrated soap-gum solution and a heavier aqueous liquor.

10. A process as defined in claim 9 including the step of adding water to the separated soapstock before heating.

11. A process for producing an animal feed product from soda ash soapstock low in T.F.A. separated in the process of refining crude glyceride oils with an excess of soda ash, the separated soapstock containing excess soda ash, which process includes the steps of: heating the separated soapstock while containing said excess soda ash and water to a temperature of about 150–220° C. under sufficient pressure to prevent vaporization of water for a time ranging from about 30–90 minutes sufficient to produce a graining out effect; and separating the resulting product into a heavier aqueous product containing soda ash and an animal feed product comprising a soap-gum solution.

12. A process as defined in claim 11 in which said animal feed product contains at least 35% T.F.A., and in which said product is dried to remove moisture therefrom to produce a dried animal feed product.

13. A process as defined in claim 11 including the step of adding to said animal feed product only enough acid to bring it to about pH 6–8.

14. A salting-out process for upgrading soda ash soapstocks that are strongly alkaline as a result of containing excess soda ash, said soapstocks resulting from the soda ash refining of glyceride oils and containing gums from such oils, said process including the steps of: salting out a soap-gum material by heating said soapstock to and maintaining same at a temperature sufficient for the excess soda ash to decompose said gums, said soapstock being heated and maintained hot while at a superatmospheric pressure sufficient to prevent vaporizing of water; separating the resulting product into an aqueous material including sodium phosphates and into an upgraded soap-gum solution; mixing calcium chloride with the separated aqueous material to produce a mixture; and separating from said mixture a mixture of calcium carbonate and calcium phosphates.

15. A process including the steps of: mixing with cottonseed oil containing gossypol, gums and free fatty acids an aqueous solution of an alkali in sufficient amount to react with at least a part of said free fatty acids to produce soaps; centrifugally separating from the mixture a soapstock comprising said soaps, water and free alkali; heating said soapstock to a temperature of about 150–220° C. for a period of time ranging from at least 90 minutes near the lower end of such range to at least 30 minutes near the upper end of such range to produce a detoxification of said soapstock; and mixing at least a portion of the resulting detoxified soapstock with a meal to produce an animal feed.

16. A process including the steps of: mixing with cottonseed oil containing gossypol, gums and free fatty acids an aqueous solution of an alkali in sufficient amount to react with at least a part of said free fatty acids to produce soaps; centrifugally separating from the mixture a soapstock comprising said soaps, water and free alkali; and heating said soapstock while containing water up to the weight of the soapstock, said heating taking place under pressure and under turbulence in a confined space to a temperature of about 150–220° C. for a period of time ranging from at least 90 minutes near the lower end of such range to at least 30 minutes near the upper end of such range, the pressure being sufficient to prevent substantial vaporization of water during said heating, thereby detoxifying said soapstock.

(References on following page)

References Cited in the file of this patent

UNITED STATES PATENTS

| | | |
|---|---|---|
| 2,190,595 | Clayton et al. | Feb. 13, 1940 |
| 2,230,196 | Clayton | Jan. 28, 1941 |
| 2,239,131 | Thurman | Apr. 22, 1941 |
| 2,314,621 | Kelley | Mar. 23, 1943 |

FOREIGN PATENTS

| | | |
|---|---|---|
| 379,892 | Germany | Aug. 30, 1923 |

OTHER REFERENCES

Markley: "Soybeans and Soybean Products," vol. II, 1951, page 646.

Dedication 2,902,501.—*Benjamin Clayton*, Pasadena, Calif. UPGRADING OF SODA ASH SOAPSTOCK. Patent dated Sept. 1, 1959. Dedication filed June 30, 1964, by the inventor.

Hereby dedicates to the public the terminal part of the term of said patent effective December 31, 1963.

[*Official Gazette September 29, 1964.*]